(12) United States Patent
Warfen et al.

(10) Patent No.: US 11,939,958 B2
(45) Date of Patent: Mar. 26, 2024

(54) METHOD FOR OPERATING A WIND TURBINE, WIND TURBINE, AND COMPUTER PROGRAM PRODUCT

(71) Applicant: Siemens Gamesa Renewable Energy Service GmbH, Hamburg (DE)

(72) Inventors: Karsten Warfen, Weede / Söhren (DE); Timo Gosch-Pleß, Osterrönfeld (DE)

(73) Assignee: Siemens Gamesa Renewable Energy Service GmbH, Hamburg (DE)

( * ) Notice: Subject to any disclaimer, the term of this patent is extended or adjusted under 35 U.S.C. 154(b) by 275 days.

(21) Appl. No.: 17/295,748

(22) PCT Filed: Nov. 28, 2019

(86) PCT No.: PCT/EP2019/082939
§ 371 (c)(1),
(2) Date: May 20, 2021

(87) PCT Pub. No.: WO2020/109484
PCT Pub. Date: Jun. 4, 2020

(65) Prior Publication Data
US 2022/0018331 A1    Jan. 20, 2022

(30) Foreign Application Priority Data

Nov. 28, 2018    (DE) .......................... 102018009334.5

(51) Int. Cl.
*F03D 7/00*    (2006.01)
*F03D 7/02*    (2006.01)
*F03D 7/04*    (2006.01)

(52) U.S. Cl.
CPC .......... *F03D 7/0224* (2013.01); *F03D 7/043* (2013.01); *F05B 2270/309* (2013.01);
(Continued)

(58) Field of Classification Search
CPC .......... F03D 7/0224; F03D 7/043; F03D 7/02; F03D 7/04; F05B 2270/309;
(Continued)

(56) References Cited

U.S. PATENT DOCUMENTS 8,622,698 B2 * 1/2014 Kristoffersen .......... F03D 7/024
416/37
2007/0216166 A1 * 9/2007 Schubert ............... F03D 7/0224
290/55
(Continued)

FOREIGN PATENT DOCUMENTS

CN    101523048    9/2009
DE    102014118146 A1    6/2015
(Continued)

OTHER PUBLICATIONS

PCT International Research Report and Written Decision from the International Research Authority for International application No. PCT/EP2019/082939 filed Nov. 28, 2019; dated Mar. 6, 2020; 20 pgs.
(Continued)

*Primary Examiner* — Matthew T Largi
(74) *Attorney, Agent, or Firm* — Alix, Yale & Ristas, LLP

(57) ABSTRACT

The invention relates to a method for operating a wind turbine, to a wind turbine designed to carry out the method, and to a computer program product. The method for operating a wind turbine comprising a rotor with rotor blades that can be angularly adjusted via a turbine controller, in which a state variable that reflects the current thrust of the rotor is detected, has the following steps: a) ascertaining a short-term average value of the state variable; b) ascertaining the difference between the short-term average value of the state variable and the detected current state variable; c) ascertaining a first target blade angle correction value from the
(Continued)

ascertained difference; and d) taking into consideration the target blade angle correction value while adjusting the blade angle by means of the turbine controller.

9 Claims, 2 Drawing Sheets

(52) U.S. Cl.
CPC ... *F05B 2270/328* (2013.01); *F05B 2270/331* (2013.01); *F05B 2270/335* (2013.01)

(58) Field of Classification Search
CPC .......... F05B 2270/328; F05B 2270/331; F05B 2270/335
See application file for complete search history.

(56) References Cited

U.S. PATENT DOCUMENTS

| | | | | |
|---|---|---|---|---|
| 2009/0169378 A1* | 7/2009 | Menke | .................... | F03D 7/024 416/40 |
| 2010/0014969 A1* | 1/2010 | Wilson | .................... | F03D 7/024 416/31 |
| 2012/0009062 A1* | 1/2012 | Ingram | .................. | F03D 7/0224 416/41 |
| 2012/0035865 A1* | 2/2012 | Fujioka | .................. | F03D 17/00 702/42 |
| 2014/0301842 A1* | 10/2014 | Koerber | ................ | F03D 7/0224 416/1 |
| 2015/0005966 A1* | 1/2015 | Gerber | ...................... | F03D 7/02 700/287 |
| 2015/0086356 A1 | 3/2015 | Perley et al. | | |
| 2015/0292483 A1 | 10/2015 | Slack et al. | | |
| 2016/0305404 A1 | 10/2016 | Esbensen et al. | | |
| 2022/0074386 A1* | 3/2022 | Nielsen | .................. | F03D 7/024 |

FOREIGN PATENT DOCUMENTS

| | | |
|---|---|---|
| EP | 2604853 A1 | 6/2013 |
| EP | 2821637 A1 | 1/2015 |
| EP | 2981710 A1 | 2/2016 |
| WO | 2008041066 | 4/2008 |
| WO | 2012044161 A2 | 4/2012 |

OTHER PUBLICATIONS

German Search Report for Application No. 10 2018 009 334.5 filed Nov. 28, 2018; dated Sep. 27, 2019; 10 pgs.

* cited by examiner

METHOD FOR OPERATING A WIND TURBINE, WIND TURBINE, AND COMPUTER PROGRAM PRODUCT

BACKGROUND

The invention relates to a method for operating a wind turbine and to a wind turbine which is designed to carry out the method and also to a corresponding computer program product.

In known wind turbines, a rotor which can rotate about a substantially horizontal axis and has rotor blades rotatably arranged on it for setting the blade angle can be made to rotate by wind. In this case, the rotor is connected—possibly by means of a rotor shaft and/or a transmission—to a generator for converting the rotational energy of the rotor into electrical energy. The power-transmitting rotating components ranging from the rotor to the generator are jointly referred to as the drive train and are generally arranged in a nacelle which is rotatably mounted on a tower.

During operation of the wind turbine, the wind acting on the rotor also further causes, in addition to the desired rotation of the rotor, a thrust force which has to be entirely absorbed by the tower of the wind turbine. On account of the turbulence generally occurring with interaction of the rotor with the wind, the thrust force to be absorbed is dynamically fluctuating, this representing a not inconsiderable loading for the tower. In methods for operating wind turbines known to date, the objective of which is the optimum energy yield while complying with the operating limits of the components of the drive train, very high thrust loads can sometimes occur. The tower has to be designed for these high thrust loads, so that, when they occur, there is no direct damage to the tower or an undesired reduction in the service life of said tower. However, towers which are designed for correspondingly high thrust loads are generally costly.

EP 2 604 853 A1 discloses a method for operating a wind turbine, in which, amongst other things, a thrust force target value which is taken into account for controlling the turbine in respect of a permissible maximum value for the thrust force is determined. As a result, excessive thrust loads should be kept away from the wind turbine. A relationship between the thrust force of a wind turbine and the wake turbulence is also described, wherein the reduction in the thrust force of a wind turbine can improve the flow against a second turbine which is arranged in the wake. One disadvantage of this prior art is the calculation required for determining the thrust force target value, which calculation is based on absolute values of operating parameters which are measured in some cases, so that they are susceptible to measuring faults in principle.

SUMMARY OF THE INVENTION

The object of the invention is to provide a method for operating a wind turbine and a correspondingly designed control apparatus, in which the disadvantages of the prior art no longer occur or still occur only to a reduced extent.

This object is achieved by a method as claimed in the main claim and also a wind turbine and a computer program product as claimed in the coordinate claims. The dependent claims relate to advantageous developments.

Accordingly, the invention relates to a method for operating a wind turbine comprising a rotor with rotor blades of which the angle can be adjusted by means of a turbine controller, in which a state variable which reflects the current thrust of the rotor is detected, comprising the steps of:

determining a short-term mean value of the state variable;

determining the difference between the short-term mean value of the state variable and the detected current state variable;

determining a first target blade angle correction value from the determined difference; and the turbine controller taking into account the target blade angle correction value for the blade angle adjustment.

Furthermore, the invention also relates to a wind turbine comprising a rotor with a plurality of rotor blades of which the blade angle can be set, which rotor is arranged in a rotatable manner on a nacelle which is arranged in a rotatable manner on a tower and which rotor is connected by means of a drive train to a generator, which is arranged in the nacelle, for converting wind energy acting on the rotor into electrical energy, and comprising a turbine controller for controlling the wind turbine and its components, wherein the turbine controller is designed to carry out one of the methods according to the invention.

The invention also relates to a computer program product comprising program parts which, when loaded in a computer, preferably the turbine controller of a wind turbine, are designed to carry out the method according to the invention.

First of all, a few terms used in connection with the invention will be explained.

A "state variable" is a measurable variable or a variable which can be determined from measurement values and represents the current state of the wind turbine which is in operation. A state variable may be, in particular, a measurement value or a value which is calculated from measurement values, detected by the turbine controller of the wind turbine and used for ultimately controlling the wind turbine. However, it is also possible for the state variable to be determined separately for the present method.

A current state variable is considered to be "reflective of the current thrust of the rotor" when a change in the thrust can be inferred from a change in the state variable with probability bordering on certainty. The fact that both the state variable and the thrust of the rotor are "current" means that the change in the state variable suggests a simultaneous change in the rotor thrust; in particular, this does not include trailing of the change in the state variable, in the case of which the change in question takes place only some time after a change in the thrust of the rotor. In this case, it is neither necessary for the thrust of the rotor to be able to be directly calculated as an absolute value from the state variable nor for there to be a direct proportionality between the change in the state variable and the change in the rotor thrust. It may already be sufficient when, on account of the change in the state variable, it is possible to establish whether the thrust of the rotor has increased or decreased, and an order of magnitude of the change in the rotor can be assumed.

A "short-term mean value" is a mean value which is calculated over a flexible, historical, simultaneous time period of a variable which is determined in principle permanently or repeatedly at short intervals based on the value of this variable determined last. The short-term mean value is therefore always determined using the values of the variable in question determined last—within the prespecified time period. In this case, the arithmetic mean of the values in question is preferably calculated.

A "target blade angle correction value" is a value which is directly taken into account by the turbine controller of the wind turbine for the regularly performed process of determining a blade angle target value, which is then converted by a suitable controller element, or for driving the blade angle adjustment. For example, the target blade angle correction value may be a blade angle delta which is added to a blade angle target value which is determined in a known manner by a turbine controller.

The invention has identified that a target blade angle correction value can be determined from the comparison of a state value, which in principle permits conclusions to be drawn about the current thrust of the rotor, with its short-term mean value in a simple manner, the process of the turbine controller taking said target blade angle correction value into account leading to a reduction in the thrust of the rotor and therefore in the thrust loading on the tower. Since the short-term mean value and said difference can be determined in a very simple manner and under the assumption that the target blade angle correction value can likewise be determined in a simple manner on the basis of the determined difference, the target blade angle correction value for changing the state variable can be determined very quickly and taken into account by the turbine controller. In the simplest case, the determined difference between the state variable and its short-term mean value is, for example, multiplied only by a gain factor in order to obtain the desired target blade angle correction value. Since the method according to the invention depends exclusively on said difference and therefore not on the absolute value of the state value, the method according to the invention is extremely robust to any drift which may occur when detecting measurement values required for the state value.

It is preferred when, parallel to steps a) to c), a second target blade angle correction value is determined from the gradient of the state variable—that is to say the partial derivative with respect to time—and is combined with the first target blade angle correction value. By way of a corresponding second target blade angle correction value, rapid changes in the state variable, which on account of determining the short-term mean value are not mapped or are mapped only with a small delay in the first target blade angle correction value, can be directly detected and accordingly taken into account by the turbine controller. It is preferred when the determined gradient of the state variable is initially smoothed and/or then multiplied by a gain factor to form the target blade angle correction value.

Combining the two target blade angle correction values can be achieved by addition or (possibly weighted) averaging, so that only one single target blade angle correction value has to be transmitted to the turbine controller and taken into account by it.

The detected state variable may be a measurement variable which is directly related to the thrust, such as a rotor blade loading or an axial loading on the rotor shaft, the transmission or the transmission mount, since these are directly related in respect of time to the rotor thrust. Measurement variables such as nacelle or tower head accelerations or the tower flexion are not suitable since they are dominated too severely by the tower natural frequencies and therefore are corrupted. The wind speed is likewise not very suitable since it can be measured only at points as an instantaneous value and therefore is not representative of the entire rotor.

The detected state variable may preferably be the current rotor blade loading of at least one rotor blade, which is preferably detected in the form of blade bending torques, preferably at the rotor blade root. If individual rotor blade loadings of more than one rotor blade, preferably of all the rotor blades of the rotor, are detected, the individual rotor blade loadings can be added up or averaged to form a single rotor blade loading.

As an alternative to this, it is possible for the detected state variable to be the current rotor torque. The current rotor torque can be determined, for example, from the current rotation speed and the current power of the wind turbine. In this case, acceleration processes of the rotor in the rotation direction and of the components of the drive train which are connected to said rotor in terms of rotation are preferably also taken into account.

In a preferred embodiment, in addition to the rotor torque, the rotor rotation speed and the rotor blade setting angle of the rotor blades are also further detected as state variable. A state variable for carrying out the method according to the invention is then formed from the detected state variables rotor torque, rotor rotation speed and rotor blade angle.

It is preferred when the short-term mean value is determined over a moving time period of from 3 to 20 s, preferably of from 8 to 15 s. It has been found that, given a correspondingly selected time period for the short-term mean value, firstly any gusts are fully "eliminated" but not at the expense of the energy yield of the wind turbine, as a result of which the energy additionally introduced by a gust would not result in any temporary increase in the power generated, but secondly load peaks, amongst others, in the tower and in the rotor blades can be effectively reduced. These averaging times are, amongst others, dependent on the site-specific average gust frequency and should be optimized in a site-specific manner in this respect.

The detected state variable is preferably filtered before determining the short-term mean value, wherein the detected current state variable for the difference calculation is then also the state variable filtered in this way. Owing to appropriate filtering, for example, any noise or other radiofrequency interference which may occur when determining the state variable on the basis of measurement values can be effectively eliminated, as a result of which the method according to the invention becomes more robust to such interference.

The maximum time delay of the current state variable due to the filtering is preferably lower than the delay due to averaging over 0.5, in particular 0.3 seconds. The manner of operation of the method according to the invention can be ensured only by such non-delayed instantaneous values of the state variable.

It is preferred when determining the first target blade angle correction value comprises multiplying the determined difference by a gain factor. It is further preferred when determining the first target blade angle correction value consists exclusively of multiplying the determined difference by a gain factor.

Reference is made to the above statements in order to explain the wind turbine according to the invention and the computer program product according to the invention.

BRIEF DESCRIPTION OF THE DRAWINGS

The invention will now be described by way of example on the basis of a preferred embodiment with reference to the appended drawings, in which.

DETAILED DESCRIPTION

Figure 1:
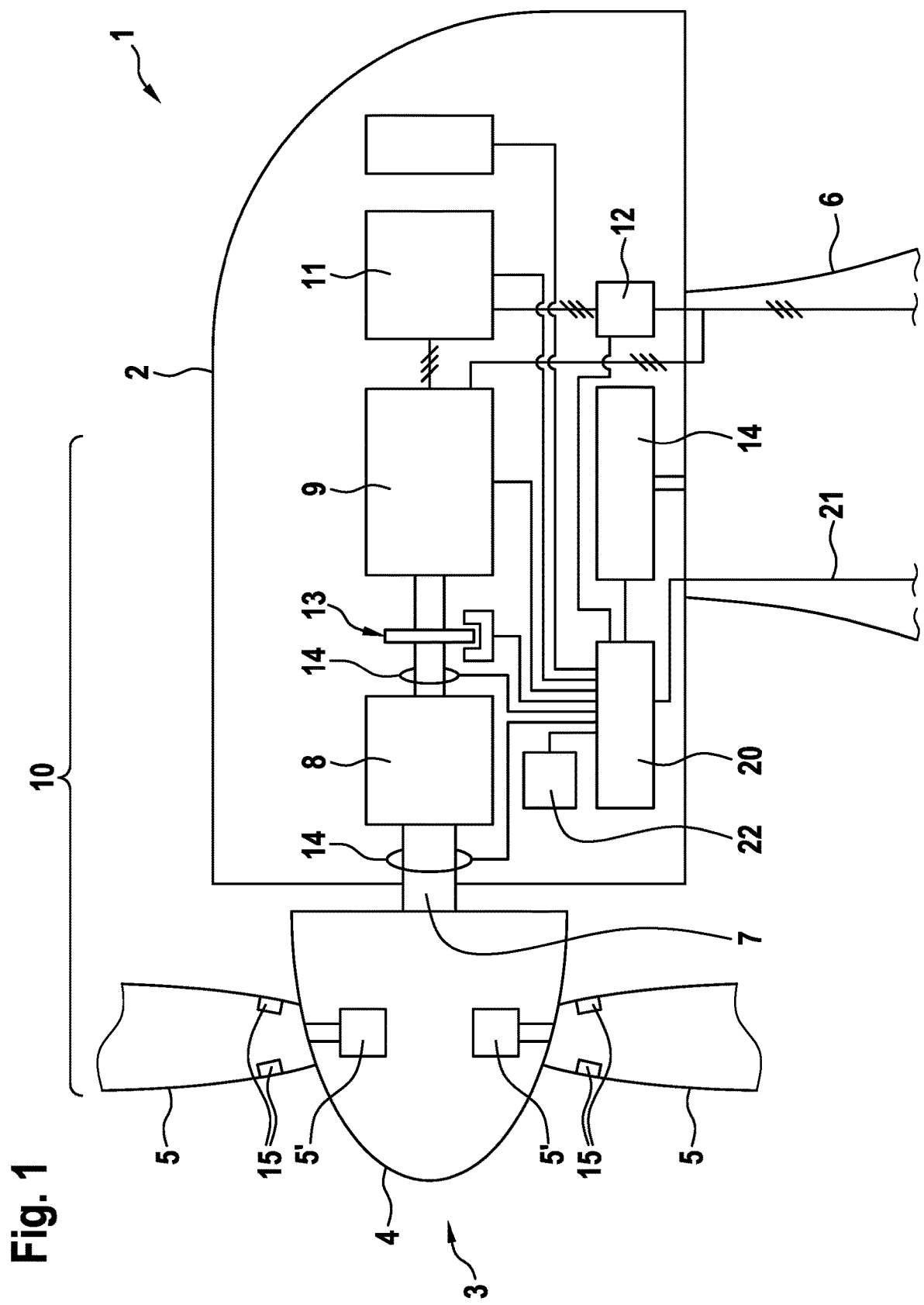
FIG. 1: shows a schematic illustration of the nacelle of a wind turbine according to the invention which is designed to carry out the method according to the invention.

FIG. 1 schematically illustrates the nacelle 2 of a wind turbine 1 according to the invention which is therefore designed to carry out the method according to the invention. The wind turbine 1 comprises a rotor 3 with a total of three rotor blades 5 which are fastened in a rotatable manner to a rotor hub 4 by means of blade angle adjusting devices 5'. The rotor 3 is arranged in a rotatable manner on the nacelle 2 which, in turn, is arranged such that it can rotate about a vertical axis on a tower 6 by means of an azimuth drive 14.

The rotor hub 4 is connected by means of a rotor shaft 7, with an interposed transmission 8, to a generator 9 for converting wind energy acting on the rotor 3 into electrical energy. The power-transmitting components ranging from the rotor 3 to the generator 9—that is to say the rotor shaft 7 and the transmission 8 in particular—form the drive train 10.

In the illustrated exemplary embodiment, the generator 9 is a doubly fed asynchronous generator, in which a portion of the power generated is conducted directly and another portion of the power is conducted via a converter 11 and a switching element 12 to a transformer (not illustrated) located at the base of the tower 6 and is fed from there into a public power supply network.

Furthermore, a brake 13 is provided between the transmission 7 and the generator 9, it being possible to brake a rotational movement of the drive train 10 and to stop the rotor 3 as required using said brake. Furthermore, measurement sensors 14 for determining the rotor rotation speed or the rotation speed of the shaft 7 are provided between the transmission 8 and the generator 9. Measurement sensors 15 for determining the rotor blade bending torques are provided on the rotor blades 5 in the region of the connection to the rotor hub 4.

The wind turbine 1 and all of its components are controlled by the computer-based turbine controller 20. For this purpose, all of the measurement values detected in the wind turbine 1 and also, via a data line 21, target values, for example from a network operator, are supplied to the turbine controller 20 and, with the aid of control algorithms known to a person skilled in the art in principle and stored in a memory 22, converted into control signals which are then, in turn, output to the various components of the wind turbine 1. The turbine controller 20 determines in a first part, on the basis of the available information, target values for individual parameters, which can be controlled by it, in respect of the operation of the wind turbine 1, these target values then being converted by other parts of the turbine controller 20 in such a way that the corresponding actual values correspond to the target values.

According to the invention, the turbine controller 20 is designed to carry out the method according to the invention described in more detail below, for which purpose a computer program product designed for this is stored in the memory 22 and executed by the turbine controller 20.

Figure 2:
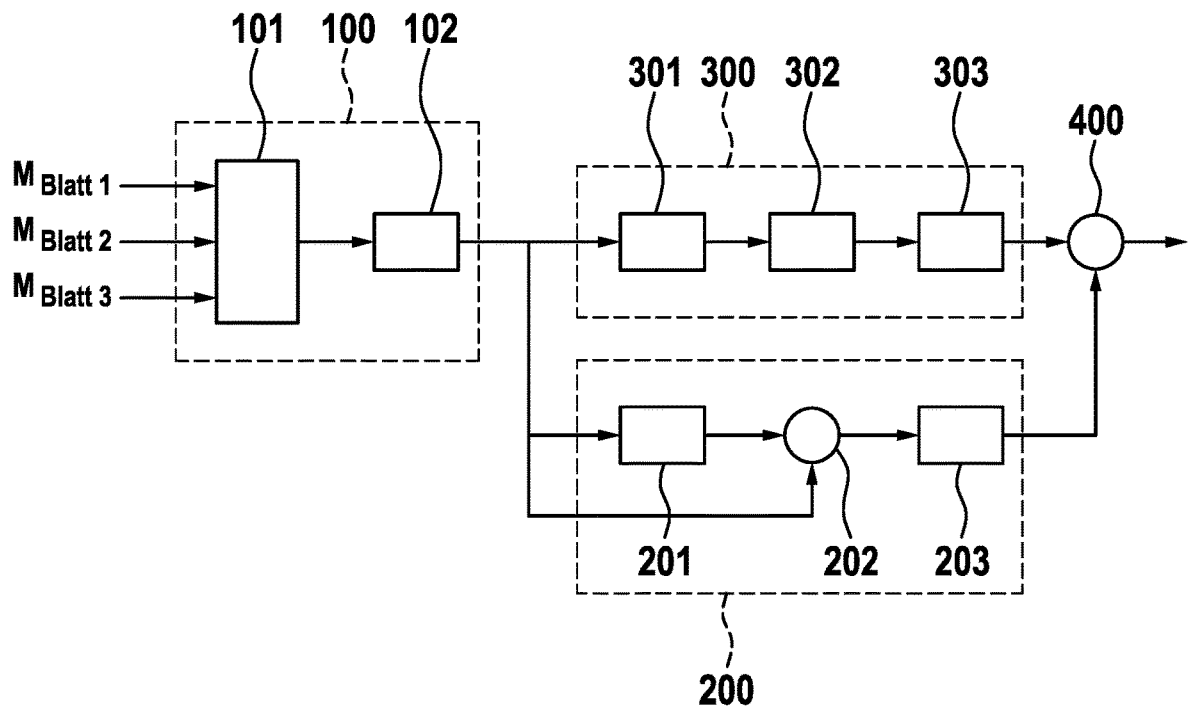
FIG. 2: shows the basic diagram of a possible first implementation of the method according to the invention.

FIG. 2 shows a basic diagram of a first implementation of the method according to the invention in the turbine controller 20. Here, the illustration is limited to the part of the turbine controller 20 which is essential for carrying out the method.

A state variable, which reflects the current thrust of the rotor 3, is determined in function block 100. For this purpose, the rotor blade bending torques $M_{Blade1 \ldots 3}$ detected by the measurement sensors 15 on the individual rotor blades 5 are added up in the functional element 101. Here, calibration of the measurement values, so that these provide the actual absolute value of the rotor blade bending torques, can be dispensed with in principle. Specifically, the method according to the invention is not based on the absolute values, but rather only on the relative change in the state variable. The state variable determined from the rotor blade bending torques is supplied to a filter 102 in order to filter out radiofrequency interference and noise of the measurement sensors 15.

The state variable determined in this way is then supplied to the function blocks 200 and 300 in parallel.

A short-term mean value of the state variable supplied is determined by the functional element 201 in function block 200, wherein the time period for calculating the short-term mean value is 10-12 s.

The difference between the short-term mean value determined by the functional element 201 and the current state variable made available by the function block 100 is determined in element 202.

The difference determined in this way is multiplied by a gain factor in the functional element 203, this then producing a first target blade angle correction value.

In parallel to the function block 200, in function block 300, the gradient of the state variable is determined by the functional element 301, then smoothed by the functional element 302, before finally being multiplied by a gain factor in the functional element 303, this then producing a second target blade angle correction value.

The first target blade angle correction value from the function block 200 and the second target blade angle correction value from the function block 300 are added up in element 400 and then fed to the turbine controller 20 in order to be taken into account for the blade angle control. The determined target blade angle correction value according to the invention can be taken into account, for example, by simple addition to the blade angle target value, particularly when the turbine controller 20 determines a blade angle target value which is then implemented by a part of the turbine controller 20 intended for that purpose.

Figure 3:
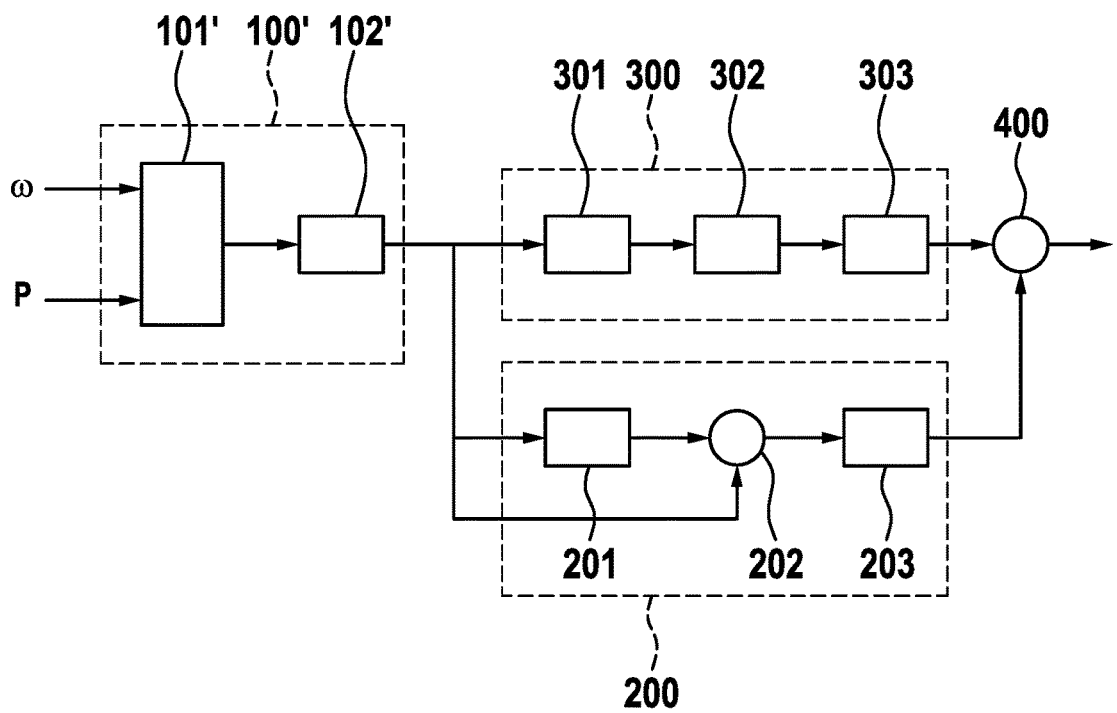
FIG. 3: shows the basic diagram of a possible second implementation of the method according to the invention.

FIG. 3 shows a basic diagram of a second implementation of the method according to the invention in the turbine controller 20. This basic diagram corresponds to that from FIG. 2, apart from the state variable used, and for this reason reference is made to the explanations provided there.

In the implementation in FIG. 1, the rotor torque, that is to say the torque currently transmitted by the rotor to the drive train, is determined by the function block 100' as the state variable. This rotor torque is calculated by the functional element 101' on the basis of the rotation speed co measured by the measurement sensors 14 and also the electrical power P ultimately generated by the generator and is then filtered by the element 102', before being made available to the function blocks 200 and 300.

The function blocks 200 and 300 are identical to those from FIG. 2. It may only be necessary for the gain factors in the functional elements 203 and 303 to be matched to the changed state variable in order to be able to determine an effective target blade angle correction value.

As is immediately apparent from the above description, the process of determining the target blade angle correction value is not based on the absolute value of the state variable at any time, but rather only on the relative change over time. As a result, the method according to the invention is extremely robust, for example to slow drifts of the values determined by the measurement value sensors.

The invention claimed is:

1. A method for operating a wind turbine comprising a rotor with rotor blades of which an angle is adjusted by means of a turbine controller, in which a state variable which reflects a current thrust of the rotor is detected, comprising the steps of:
   a) determining a short-term mean value of the state variable;
   b) determining a difference between the short-term mean value of the state variable and the detected current state variable;
   c) determining a first target blade angle correction value from the determined difference;
   d) the turbine controller taking into account the first target blade angle correction value for the blade angle adjustment.

2. The method of claim 1, wherein, parallel to steps a) to c), a second target blade angle correction value is determined from a gradient of the state variable and is combined with the first target blade angle correction value.

3. The method of claim 1, wherein the detected state variable is a current rotor blade loading which is detected in the form of blade bending torques, at a rotor blade root.

4. The method of claim 1, wherein the detected state variable is a current rotor torque.

5. The method of claim 1, wherein the short-term mean value is determined over a moving time period of 3 to 20s.

6. The method of claim 1, wherein the detected state variable is filtered before determining the short-term mean value and the detected current state variable for the difference calculation is the filtered state variable.

7. The method of claim 1, wherein determining the first target blade angle correction value comprises multiplying the determined difference by a gain factor.

8. A wind turbine comprising a rotor with a plurality of rotor blades of which the blade angle can be set, which rotor is arranged in a rotatable manner on a nacelle which is arranged in a rotatable manner on a tower and which rotor is connected by means of a drive train to a generator, which is arranged in the nacelle, for converting wind energy acting on the rotor into electrical energy, and comprising a turbine controller for controlling the wind turbine and its components, wherein the turbine controller is configured to carry out the method of claim 1.

9. A non-transitory computer readable medium comprising instructions which, when loaded in a computer, preferably the turbine controller of a wind turbine, carry out the method of claim 1.

* * * * *